United States Patent [19]

Emmerling et al.

[11] Patent Number: 4,857,623

[45] Date of Patent: Aug. 15, 1989

[54] ALKOXYSILANE-TERMINATED, MOISTURE-HARDENING POLYURETHANES AND THEIR USE IN ADHESIVES AND SEALING COMPOSITIONS

[75] Inventors: Winfried Emmerling, Erkrath; Tore Podola, Monheim, both of Fed. Rep. of Germany

[73] Assignee: Henkel Kommanditgesellschaft auf Aktien, Duesseldorf, Fed. Rep. of Germany

[21] Appl. No.: 89,383

[22] Filed: Aug. 25, 1987

[30] Foreign Application Priority Data

Aug. 28, 1986 [DE] Fed. Rep. of Germany ....... 3629237

[51] Int. Cl.[4] ..................... C08G 77/04; C08G 77/22; C08G 77/26
[52] U.S. Cl. ........................ 528/28; 528/29; 528/30; 528/38
[58] Field of Search ........................ 528/28, 29, 30, 38

[56] References Cited

U.S. PATENT DOCUMENTS

| | | | |
|---|---|---|---|
| 3,627,722 | 5/1970 | Selter et al. | 260/37 N |
| 3,979,344 | 9/1976 | Bryant et al. | 260/18 TN |
| 4,555,561 | 11/1985 | Sugimori et al. | 528/28 |
| 4,567,228 | 1/1986 | Gaa et al. | 528/28 |
| 4,582,873 | 4/1986 | Gaa et al. | |

FOREIGN PATENT DOCUMENTS

| | | | |
|---|---|---|---|
| 1115758 | 5/1968 | France | 528/28 |
| 0108479 | 6/1985 | Japan | 528/28 |

OTHER PUBLICATIONS

Patent Abstracts of Japan–Kokai–Nr. 60–47014 vol. 9 Number 175 (C-292) [1898].

*Primary Examiner*—Morton Foelak
*Assistant Examiner*—Dennis R. Daley
*Attorney, Agent, or Firm*—Ernest G. Szoke; Wayne C. Jaeschke; Henry E. Millson, Jr.

[57] ABSTRACT

Alkoxysilane-terminated, moisture-hardening polyurethanes obtained by reaction of OH-terminated diols and/or triols with diisocyanates to form NCO-terminated polyurethanes having an NCO functionality of at least 2, and reaction of some of the NCO groups with aliphatic alcohols to form a polyurethane having an NCO functionality of at least 1 and less than 2, or by reaction of the OH-terminated linear diols or triols with a mixture of mono- and diisocyanates to form NCO-terminated polyurethanes having an NCO functionality of at least 1 and less than 2, followed by a reaction of substantially all the free NCO functions of the polyurethanes obtained with aminoalkyl, mercaptoalkyl or epoxyalkyl alkoxysilanes. The polyurethanes thus obtained are particularly suitable as a basis for moisture-hardening one-component sealing compounds and adhesives.

16 Claims, No Drawings

ALKOXYSILANE-TERMINATED, MOISTURE-HARDENING POLYURETHANES AND THEIR USE IN ADHESIVES AND SEALING COMPOSITIONS

BACKGROUND OF THE INVENTION

1. Field of the Invention

This invention relates to alkoxysilane-terminated, moisture-hardening polyurethanes, to a process for their production, and to their use in adhesives and sealing compounds.

2. Statement of Related Art

Moisture-hardening one-component polyurethane systems containing free NCO groups are known as a basis for paints, adhesives and sealing compounds. In other known systems, NCO groups of a polyurethane prepolymer are reacted with alkoxysilanes in which an allyl group on silicon carries an isocyanate-reactive group (for example mercapto, amine), see, e.g. U.S. Pat. No. 3,627,722. This technique is said to improve adhesion to various inorganic surfaces. However, hardening (crosslinking) always involves the participation of unreacted, free NCO groups.

Polyurethanes reacted with organofunctional alkoxysilanes are also a constituent of many primers on inorganic materials. In this case, too, the $Si(OR)_3$ groups improve adhesion between the inorganic substrate and the actual paint. In addition, published German application No. 25 51 275 describes an automobile sealing compound which hardens solely through terminal alkoxysilane groups. Extremely hard compounds, for example having a shore-A-hardness of 63, are obtained.

One-component polyurethane systems which harden substantially through terminal isocyanate groups occasionally give off small bubbles in the hardened mass from carbon dioxide partially released during the crosslinking process. By contrast, hardening through $Si(OR)_3$ groups is in principle bubble-free.

In their hardened state, however, polyurethane systems containing terminal $Si(OR)_3$ groups generally form hard, brittle compositions of limited elasticity. In this form, they are not suitable as a basis for sealing compounds because for many applications soft and elastic materials of high resilience are required.

Accordingly, systems of the above type having greater elasticity than, for example, the polymer systems described in German application No. 25 51 275 would be desirable.

STATEMENT OF THE INVENTION

Other than in the operating examples, or where otherwise indicated, all numbers expressing quantities of ingredients or reaction conditions used herein are to be understood as modified in all instances by the term "about".

The present invention is directed to alkoxysilane-terminated polyurethane prepolymers which harden without bubble formation in the presence of moisture and show better elasticity than the state-of-the art materials which harden without bubble formation.

According to the invention, these benefits are achieved with alkoxysilane-terminated, moisture-hardening polyurethanes obtainable as follows:

(a) reaction of OH-terminated linear diols and/or triols with diisocyanates to form NCO-terminated polyurethanes having a number average NCO functionality of at least 2, and reaction of some of the NCO-groups with linear or branched aliphatic alcohols containing from 1 to 18 carbon atoms or monoalkylpolyether alcohols to form a polyurethane having a number average NCO functionality of at least 1 and less than 2, or (a') reaction of the OH-terminated linear diols or triols with a mixture of mono- and diisocyanates to form NCO-terminated polyurethanes having a number average NCO functionality of at least 1 and less than 2, and reaction of substantially all the free NCO-groups of the resulting polyurethanes with at least one alkoxysilane corresponding to the following general formula:

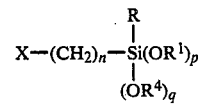

in which
$X = $ —SH, —$NHR^2$,

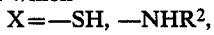

—(NH—$CH_2$—$CH_2$)$_{n'}$—$NHR^2$;
$n' = 1$ or 2;
$R = $ —$CH_3$, —$CH_2$—$CH_3$, or $OR^1$;
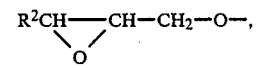
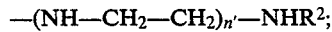
$R^2 = $ H or an optionally substituted (with one or more $C_1$-$C_3$ alkyl and/or $C_1$-$C_3$ alkoxy groups) aliphatic and/or cycloaliphatic or aromatic hydrocarbon radical containing from 1 to 10 carbon atoms,
$R^3 = $ an optionally substituted (with one or more $C_1$-$C_3$ alkyl and/or alkoxy groups) alkyl radical containing from 1 to 10 carbon atoms,
$R^4 = $ an alkyl radical containing from 1 to 4 carbon atoms, and
$n = 1$-$8$, $m = 1$-$30$, $p \geq 1$ and $q + p = 2$.

The OH-terminated linear diols or triols suitable for use in accordance with the invention have number average molecular weights of preferably from 300 to 6500 and more preferably from 500 to 3000. Preferred representatives are alkoxylation products, more especially ethoxylation and/or propoxylation products, of difunctional or trifunctional alcohols selected from the group: ethylene glycol, diethylene glycol, triethylene glycol, 1,2-propanediol, dipropylene glycol, the butanediols, hexanediols, octanediols, technical mixtures of $C_{14}$-$C_{22}$ hydroxyfatty alcohols, more especially hydroxystearyl alcohol, trimethylolpropane, and glycerol. A more hydrophobic or hydrophilic character may be given to the basic molecule. It is possible by predominant addition of propylene oxide to polyhydric alcohols to obtain a predominantly hydrophobic molecule, whereas the addition of or exclusive alkoxylation with ethylene oxide gives more hydrophilic molecules. This also affects the properties of the macromolecule formed after the final crosslinking reaction.

Other suitable polyhydroxyl compounds are polyesters of low molecular weight dicarboxylic acids, such as adipic acid, isophthalic acid, terephthalic acid, and phthalic acid, with an excess of the above-mentioned polyols.

Typical representatives of aromatic diisocyanates are 2,4- and 2,6-toluene diisocyanate, more especially in the form of a technical grade mixture; phenylene diisocyanate, 4,4'-diphenyl diisocyanate, 1,5-naphthalene diisocyanate, 4,4'-diphenylmethane diisocyanate, 3,3'-dimethoxy-4,4'-diphenyl diisocyanate, and xylylene diisocyanate.

Representatives of aliphatic diisocyanates are, in particular, 1,4-tetramethylene diisocyanate, 1,6-hexamethylene diisocyanate, decane-1,10-diisocyanate, 2,2,4-trimethyl hexamethylene diisocyanate, dicyclohexyl methane diisocyanate, isophorone diisocyanate, and the technical isocyanates obtainable by phosgenation of the amines which accumulate in the hydrogenation of dimer fatty acid nitriles.

Representatives of the monoisocyanates are, primarily, aromatic monoisocyanates, such as phenyl isocyanate, tolyl isocyanate and naphthylene isocyanate.

Linear or branched aliphatic alcohols suitable for use in accordance with the invention are, in particular, methanol, ethanol, the isomers of propanol, butanol and hexanol, and the primary $C_8$–$C_{18}$ alcohols obtainable by reduction of fatty acids, such as octanol, decanol, dodecanol, tetradecanol, hexadecanol and octadecanol, more especially in the form of technical grade mixtures thereof. $C_4$–$C_{18}$ monoalcohols are preferred because the lower alcohols are difficult to produce in anhydrous form.

It is also possible to use monoalkylpolyalkylene glycol, e.g. mono $C_1$–$C_6$ alkylpoly $C_2$–$C_3$ alkylene glycol, of different molecular weight, a number average molecular weight of from 1000 to 2000 being preferred. One example of a preferred representative is monobutyl polypropylene glycol.

The lower the NCO functionality of the alcohol-reacted NCO-terminated polyurethanes, the more elastic the hardened, silanized end products can be made. Accordingly, the number average NCO functionality of the alcohol-reacted NCO-terminated polyurethanes from step (a) or (a') is preferably between 1.2 and 1.8.

The alkoxysilanes corresponding to the above general formula are standard commercial compounds. A description of these compounds and the way in which they work can be found in the book entitled "Silane Coupling Agents" by Plueddemann, Plenum Press, New York (1982).

The reaction of the free NCO groups of the polyurethanes with the alkoxysilanes corresponding to the above general formula preferably takes place in the presence of catalysts of the type known, for example, from U.S. Pat. No. 3,627,722. Dibutyltin dilaurate is preferably used as the catalyst.

The present invention also relates to the above disclosed process for the production of the alkoxysilane-terminated, moisture-hardening polyurethanes.

The present invention also relates to moisture-hardening adhesives and sealing compositions containing the alkoxysilane-terminated polyurethanes of the invention, and, optionally, standard additives, such as pigments, fillers, hardening catalysts and UV stabilizers. Suitable fillers are inorganic compounds inert to isocyanates, for example, chalk or lime powder, precipitated and/or pyrogenic silica, zeolites, bentonites, ground minerals and other inorganic fillers familiar to those skilled in this art. It is also possible to use organic fillers, more especially short staple fibers and the like. Fillers which impart thixotropic properties to the compositions, for example swellable plastics, such as PVC, are preferred for certain applications.

A typical hardening catalyst is the above-disclosed dibutyltin dilaurate. Crosslinking agents which act as hardening accelerators, such as ethyltriacetoxysilane, are preferably also added to the compositions.

The invention is illustrated but not limited by the following Examples and comparison tests. All parts given below are parts by weight.

EXAMPLE 1

In a heatable stirring vessel, 800 parts (=0.8 equivalent) of polypropylene glycol having a molecular weight of 2025 and 150 parts (=1.2 equivalents) of 4,4'-diphenylmethane diisocyanate (MDI) were reacted with stirring at 80° C. in a nitrogen atmosphere. The theoretical value of 1.77% NCO groups was reached after about 5 hours. Thereafter 150 parts (=0.2 equivalent) of polypropylene glycol monobutylether (MW 750) were added and the mixture allowed to continue reacting to the theoretical NCO content of 0.76%. After this value had been reached, 39.2 parts (=0.2 equivalent) of mercaptopropyl trimethoxysilane and 0.23 part of dibutyltin dilaurate were added, followed by stirring for another 2 hours. All the reactions were carried out at 80° C. The NCO content measured thereafter was below 0.03%. The end product had a Brookfield viscosity at 25° C. of 200,000 mPa.s.

COMPARISON TEST A

An NCO-terminated prepolymer was prepared under the same conditions as in Example 1 from 800 parts (=0.8 equivalent) of polypropylene glycol having a molecular weight of 2025 and 150 parts (=1.2 equivalents) of MDI. The prepolymer thus prepared was completely reacted in a second reaction step with 78.4 parts (=0.4 equivalent) of mercaptopropyltrimethoxysilane and 0.21 part of dibutyltin dilaurate. The end product had a Brookfield viscosity at 25° C. of 240,000 mPa.s.

EXAMPLE 2

900 parts (=0.9 equivalent) of polypropylene glycol having a molecular weight of 2025, 4.5 parts (=0.1 equivalent) of trimethylolpropane and 212.5 parts (=1.7 equivalents) of MDI were reacted under the conditions as in Example 1 to form an NCO-terminated prepolymer (NCO=2.6%). 26.25 parts (0.35 equivalent) of butanol were added to the prepolymer thus prepared. After the theoretical NCO content of 1.2% had been reached, 68.6 parts (=0.35 equivalent) of mercaptopropyltrimethoxysilane and 0.2 part of dibutyltin dilaurate were added. All the reactions were carried out under dry nitrogen at a temperature of 80° C. The NCO content measured thereafter was below 0.03%. The product had a Brookfield viscosity at 25° C. of 430,000 mPa.s.

COMPARISON TEST B

The NCO-terminated intermediate product of Example 2 was reacted with 137.2 parts (=0.7 equivalent) of mercaptopropyltrimethoxysilane and 0.2 part of dibutyltin dilaurate. The NCO content measured thereafter was below 0.03%. The product had a Brookfield viscosity at 25° C. of 540,000 mPa.s.

EXAMPLE 3

The described alkoxysilane-terminated prepolymers of Examples 1 and 2, and those of the Comparison Tests A and B were each mixed with 7.5% by weight of ethyltriacetoxysilane and 1.5% by weight of dibutyltin dilaurate and hardened in the presence of atmospheric moisture. The mechanical properties of the hardened products were tested on approx. 2 mm thick films in accordance with DIN 53 504.

The Table shows that the alkoxysilane-terminated polyurethanes according to the invention show a considerably higher elongation at break after hardening in air.

TABLE

| Prepolymer of | Tensile strength N/cm$^2$ | Elongation at break % |
|---|---|---|
| Example 1 | 30 | 150 |
| Comparison test A | 50 | 50 |
| Example 2 | 10 | 150 |
| Comparison test B | 10 | 25 |

We claim:

1. An alkoxysilane-terminated, moisture-hardening polyurethane prepared by the process comprising the steps of
   (a) reacting at least one OH-terminated linear diol or triol with at least one diisocyanate to form an NCO-terminated polyurethane having a number average NCO functionality of at least 2,
   (b) reacting some of the NCO-groups on the polyurethane obtained in step (a) with at least one linear or branched aliphatic alcohol containing from 1 to 18 carbon atoms or a monoalkylpolyalkylene glycol to form a polyurethane having a number average NCO functionality of at least 1 and less than 2, and
   (c) reacting substantially all the free NCO-groups in the polyurethane obtained from step (b) with at least one alkoxysilane corresponding to the formula

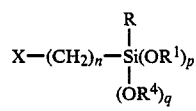

in which
X=—SH, —NHR$^2$,

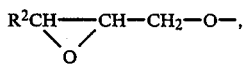

—(NH—CH$_2$—CH$_2$)$_{n'}$—NHR$^2$;
n'=1 or 2;
R=—CH$_3$, —CH$_2$—CH$_3$, or OR$^1$;
R$^1$=—(CH$_2$—CH$_2$—O)$_m$—R$^3$;
R$^2$=H or an aliphatic or cycloaliphatic or aromatic hydrocarbon radical containing from 1 to 10 carbon atoms and optionally substituted with one or more C$_1$-C$_3$ alkyl and/or C$_1$-C$_3$ alkoxy groups;
R$^3$=an alkyl radical containing from 1 to 10 carbon atoms and optionally substituted with one or more C$_1$-C$_3$ alkyl and/or C$_1$-C$_3$ alkoxy groups;
R$^4$=an alkyl radical containing from 1 to 4 carbon atoms; and
n=1-8; m=1-30; p≧1; and q+p=2.

2. The polyurethane of claim 1 wherein the linear diol or triol has a number average molecular weight of from about 300 to about 6500.

3. The polyurethane of claim 2 wherein the linear diol or triol has a number average molecular weight of from about 500 to about 3000.

4. The polyurethane of claim 1 wherein the OH-terminated linear diol or triol is an alkoxylation product.

5. The polyurethane of claim 4 wherein the alkoxylation product is an ethoxylation and/or propoxylation product.

6. The polyurethane of claim 5 wherein the linear diol or triol is at least one of ethylene glycol, diethylene glycol, triethylene glycol, 1,2-propanediol, dipropylene glycol, a butanediol, a hexanediol, an octanediol, hydroxystearyl alcohol, trimethylene glycol, glycerol, or trimethylolpropane.

7. The polyurethane of claim 1 wherein the polyurethane obtained in step (b) has a number average NCO functionality of from about 1.2 to about 1.8.

8. The polyurethane of claim 1 wherein in step (b) a mono C$_1$-C$_6$ alkylpolyalkylene glycol is employed having a number average molecular weight of from about 1000 to about 2000.

9. A process for the preparation of an alkoxysilane-terminated, moisture-hardening polyurethane comprising the steps of
   (a) reacting at least one OH-terminated linear diol or triol with at least one diisocyanate to form an NCO-terminated polyurethane having a number average NCO functionality of at least 2,
   (b) reacting some of the NCO-groups on the polyurethane from step (a) with at least one linear or branched aliphatic alcohol containing from 1 to 18 carbon atoms or a monoalkylpolyalkylene glycol to form a polyurethane having a number average NCO functionality of at least 1 and less than 2, and
   (c) reacting substantially all the free NCO-groups in the polyurethane obtained from step (b) with at least one alkoxysilane corresponding to the formula

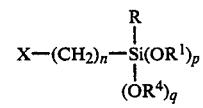

in which
X=—SH, —NHR$^2$, R$^2$CH—CH—CH$_2$—O—,
—(NH—CH$_2$—CH$_2$)$_{n'}$—NHR$^2$;
n'=1 or 2;
R=—CH$_3$, —CH$_2$—CH$_3$, or OR$^1$;
R$^1$=—(CH$_2$—CH$_2$—O)$_m$—R$^3$;
R$^2$=H or an aliphatic or cycloaliphatic or aromatic hydrocarbon radical containing from 1 to 10 carbon atoms and optionally substituted with one or more C$_1$-C$_3$ alkyl and/or C$_1$-C$_3$ alkoxy groups;
R$^3$=an alkyl radical containing from 1 to 10 carbon atoms and optionally substituted with one or more C$_1$-C$_3$ alkyl and/or C$_1$-C$_3$ alkoxy groups;
R$^4$=an alkyl radical containing from 1 to 4 carbon atoms; and
n=1-8; m=1-30; p≧1; and q+p=2.

10. The process of claim 9 wherein in step (a) the linear diol or triol has a number average molecular weight of from about 300 to about 6500.

11. The process of claim 10 wherein the linear diol or triol has a number average molecular weight of from about 500 to about 3000.

12. The process of claim 9 wherein in step (a) the OH-terminated linear diol or triol is an alkoxylation product.

13. The process of claim 12 wherein the alkoxylation product is an ethoxylation and/or propoxylation product.

14. The process of claim 13 wherein the linear diol or triol is at least one of ethylene glycol, diethylene glycol, triethylene glycol, 1,2-propanediol, dipropylene glycol, a butanediol, a hexanediol, an octanediol, hydroxystearyl alcohol, trimethylene glycol, glycerol, or trimethylolpropane.

15. The process of claim 9 wherein the polyurethane obtained in step (b) has a number average NCO functionality of from about 1.2 to about 1.8.

16. The polyurethane of claim 9 wherein in step (b) a monoalkylpolyalkylene glycol is employed having a number average molecular weight of from about 1000 to about 2000.

* * * * *

UNITED STATES PATENT AND TRADEMARK OFFICE
CERTIFICATE OF CORRECTION

PATENT NO. : 4,857,623

DATED : August 15, 1989

INVENTOR(S) : Winfried Emmerling et al.

It is certified that error appears in the above-identified patent and that said Letters Patent is hereby corrected as shown below:

In Claim 9, at Col. 6, line 44, "X=-SH, -NHR$^2$,R$^2$CH-CH-CH$_2$-O-," should read --X=-SH,-NHR$^2$,R$^2$CH-CH-CH$_2$-O-,--
$$\underset{O}{\overset{}{\diagdown\diagup}}$$

Signed and Sealed this

Twenty-second Day of January, 1991

Attest:

HARRY F. MANBECK, JR.

*Attesting Officer*  *Commissioner of Patents and Trademarks*